Patented Sept. 4, 1945

2,384,077

UNITED STATES PATENT OFFICE 2,384,077

MANUFACTURE OF CHOCOLATE CONFECTIONS

Raymond W. Crosley and Herbert W. Conner, Chicago, Ill., assignors to Wm. Wrigley, Jr. Company, Chicago, Ill., a corporation of Delaware No Drawing. Application September 27, 1943, Serial No. 504,054

15 Claims. (Cl. 99—23)

Our invention relates to the preparation of chocolate compositions or chocolate confections and is particularly concerned with the preparation of such compositions or confections, in the form of relatively dense bars, blocks or tablets, which have the property of withstanding temperatures above the melting point of cocoa butter and up to about 130 degrees F. and in some cases even higher, over prolonged periods of time without undue softening.

The preparation of chocolate compositions or confections, in the form of so-called concentrated emergency rations, having the property of withstanding temperatures up to 130 degrees F. without liquefaction, has heretofore been suggested and practiced. Such chocolate compositions have utilized, in addition to bitter chocolate, sucrose, skim milk powder and added cocoa butter, a substantial content of a cereal flour, particularly raw oat flour. In the preparation of such chocolate compositions, the ingredients have been mixed in a manner such as to produce a composition of dough-like consistency or of the physical nature of putty, and the resulting dough-like or putty-like composition has been molded by force to convert the same into bars of the desired shape or configuration. The raw oat flour and the skim milk powder are stated to function as absorption media for the fat released from the chocolate when ground, in addition to imparting the food values which are inherent in the said oat flour and skim milk powder.

The resulting chocolate composition, in the form of bars or similar forms, does possess a considerable advantage over ordinary commercial bars with regard to withstanding summer and tropical temperatures over prolonged periods of time without liquefaction or undue softening. However, it also possesses certain marked disadvantages, among which may be mentioned its relatively poor palatability due, essentially, to the necessity for the utilization of a high content of cereal flour, the use of which, pursuant to the aforementioned prior practice, has been found to be necessary in order to obtain the desired properties of withstanding elevated temperatures. In addition, the bars which are produced are non-homogeneous and have a relatively porous structure so that, when the bar is subjected to somewhat elevated temperatures followed by lower temperatures, as is characteristic of the ordinary conditions of shipment and storage, the "blooming" which usually or frequently occurs affects not only the surface layers of the bar but permeates through the entire structure, thus imparting an unsightly appearance to the bar as a whole. Apart from these deficiencies as to the product itself, the process by which it is made also possesses certain serious disadvantages, chief among which is the fact that, in order to obtain the mixture of the aforementioned ingredients in the form of a dough-like or putty-like mass of the proper consistency for molding by force, very careful control methods are required. Indeed, even with the best control methods known and employed in the art, frequent batches result which do not have proper resistance to softening by heat. The present known procedures, moreover, are relatively highly costly in their requirement of the use of special tamping and shaking operations in the production of the chocolate compositions.

In accordance with our invention, chocolate confections or compositions may be prepared, in the form of dense tablets or bars, which possess not only the advantage of withstanding elevated temperatures over prolonged periods of time without undue softening but, in addition, have the important advantage of materially improved palatability since, in their preparation, it is unnecessary to use any cereal flour. Furthermore, the bars, produced in accordance with our invention, are not characterized by the porous and visible cavities of the bars made in accordance with the aforementioned known practice but, on the contrary, are materially more dense. As a consequence the bloom which results from temperature changes does not in the case of bars made in accordance with our invention accumulate on the surface of internal cavities nor impart a blotched and unsightly appearance to a broken surface of the bar as occurs in bars produced in accordance with the aforementioned known practice. A still further advantage of our invention resides in the fact that it enables chocolate compositions to be made with higher contents of fatty material than are possible following heretofore known procedures while still retaining resistance to undue softening by heat. Such higher contents of fatty materials result in compositions of improved palatability and higher energy concentration.

The clear distinctions between chocolate bars made in accordance with our invention and chocolate bars made pursuant to the aforementioned known practice, as discussed hereinabove, are evident not only from a visual inspection of the bars and particularly their internal structure, distinctions which are even more emphatically observable under the microscope, but in addition, other properties of the said chocolate compositions are readily distinguishable. If pieces of the chocolate composition of the aforementioned prior practice are agitated gently in water, an uneven dispersion is formed in which both small particles of the composition and also large agglomerates are present, forming a non-uniform suspension. By way of sharp contrast, when pieces of the chocolate composition of our invention are gently agitated in water, practically complete dispersion occurs and a very fine, substantially uniform dispersion or suspension of the chocolate particles in the water is obtained.

Our invention also possesses important advantages over the aforementioned prior practice in connection with the method of preparation of the products in that the close control methods, which are necessarily required in order to obtain results in accordance with the aforementioned prior practice, are not required in the practice of our invention.

In general, our method of preparing the novel chocolate confections or compositions of our invention comprises subjecting a solid or non-flowable mixture of chocolate, preferably bitter chocolate; sugar, particularly sucrose; and preferably, but not necessarily, cocoa butter or a fat having generally similar properties; with or without the addition of a dried milk product such as dried or powdered skim milk, to what we characterize as "cold-working" while maintaining the temperature of the mixture below the melting point of the fatty material thereof.

While various types of equipment may be utilized to bring about the cold-working, such as mullers, edge-runner mills, burr mills operating at relatively slow speeds, and the like, we have found that the use of opposing rolls is exceptionally satisfactory, particularly such rolls as are used in rubber mills, although the power required for operating said rolls, for the treatment of the chocolate compositions in accordance with the present invention, may be materially less than is required for operating on rubber. As is well known, such rolls revolve in opposite directions and one of the rolls revolves at a surface speed somewhat greater than that of the other. It will be understood that, by the term "cold-working," as used herein and in the claims, we mean such mechanical working as is brought about by rolls, mullers, edge-runner mills and like or equivalent apparatus.

As we have pointed out hereinabove, we have found it important, during the subjection of the solid or non-flowable chocolate composition to the cold-working, that the temperature of the chocolate mixture be maintained below the melting temperature of the fatty material thereof and, as a practical proposition, we have found that such temperature should not exceed approximately 83 degrees F. and should, preferably, be maintained substantially below the said temperature, a good working range being of the order of 55 degrees F. to 70 degrees F. To this end, where rolls or the like are employed, they should be maintained cold as, for example, by passing a refrigerating medium therethrough during the rolling operation in order to dissipate the heat which results from the rolling operation. If the product during the roll-milling is maintained at too low a temperature, for example, 36 degrees F., there is sometimes difficulty in stripping the material from the roll in the desired form. The rolls, in operation, are spaced apart a small fraction of an inch, as for example, one one-hundredth of an inch or less up to about a tenth of an inch, although the exact spacing is somewhat variable. Similarly, the speed of rotation of the rolls is variable within wide limits, although a speed of approximately 1 to 5 lineal feet per second is satisfactory in at least most cases. Where the rolls operate at different speeds, the speed differential between the two rolls may be that which is commonly employed in the rubber industry, for example, of the order of 30% to 50%.

While the exact mechanism of the changes which take place in the internal structure of the chocolate composition as a result of the cold-working have not been fully ascertained, present indications point to a redistribution of the cocoa butter or fat content and the arrangement thereof as dispersed globules, in a finely divided form, throughout the mass of the remaining ingredients. Whatever the full explanation may be, the fact is that such chocolate compositions possess properties and characteristics which readily distinguish them from products heretofore known and produced in accordance with the prior practices heretofore mentioned.

When rolls are used for effecting the cold-working, and particularly rolls of the type of the usual rubber rolls, the chocolate composition tends to adhere to the rolls during and after the action thereof on the said composition. The composition is removed from the rolls by means of scrapers or like devices. A convenient device comprises a scraper permanently mounted so that the material is continuously removed after a single passage between the rolls. It commonly occurs that a single passage is not sufficient to produce the desired effect. In such case the partially worked material may be replaced on the rolls for further working, or may be fed back to the rolls by means of suitable elevators or conveyors, or may be passed successively through a plurality of roll assemblies.

The chocolate composition as finally removed from the rolls comprises largely broken fragments of a thin sheet in pieces of various sizes up to several square inches in area. These fragments tend to be curled, or even rolled up in a manner suggesting broken cinnamon quills or soap shavings. The fragments are not doughy or putty-like in character and may be piled up or collected in barrels to form a loose non-coherent mass of dry solid particles. When freshly removed from the rolls they are frequently somewhat waxy and translucent in appearance and tend to be flexible like wax, but are not sticky and do not weld together under their own weight. Within a period of from a few seconds to a minute or more they lose the waxy appearance and become dull, opaque, and brittle. The curled material is commonly accompanied by a certain proportion of powder or granular material which is also useable, but within the limits of our experience with the process the formation of curled fragments is symptomatic of the proper degree of cold-working; that is we have uniformly found that when such curled fragments are obtained in the roll-milling operation, then the cold-working is of such a character as to insure the formation of excellent bars, blocks, or tablets.

The material removed from the rolls possesses certain cohesive properties and a certain plasticity. After the lapse of a short period of time, generally somewhat less than a minute, the plasticity decreases and the material becomes somewhat friable and brittle. The cohesive properties of the composition, however, appear to be retained for a substantial period of time, namely, of the order of a week or two weeks and, in some cases, even somewhat longer. The importance of this change which takes place in the composition after removal from the rolls appears in connection with the subsequent step, if such be used, of compacting the composition into the form of tablets or bars or the like.

If bars or block-like masses are to be made from the roll-milled chocolate composition by means of a continuous extrusion procedure where, for example, the composition is forced through a die by means of a worm or rotary screw and the extruded mass cut into sections of desired length, it is important that the roll-milled composition be subjected to extrusion promptly after removal of said composition from the rolls. Where tableting equipment, such as Stokes tableting machines, is used for shaping the roll-milled or cold-worked chocolate composition into the form of tablets or bars or the like, the chocolate composition may be subjected to the tableting action even after standing for as long as a week or two, and, in some cases, longer, subsequent to cold-working or the removal of the composition from the rolls. In any case excessive delay should be avoided between the time of cold-working and the time of shaping the cold-worked mass, whether employing extrusion processes or tableting. Excessive delay in shaping is evidenced by greater pressures being required to form the product and by a product which is not mechanically strong enough to stand rough treatment.

Irrespective of what methods are employed for shaping the roll-milled or cold-worked chocolate composition, the temperature of the composition should not be permitted to rise unduly high, that is, for example, to near the melting point of the fat constituent thereof. To this end, suitable jacketing and refrigerating media may be employed for maintaining the equipment and the composition undergoing the treatment at the desired low temperature.

For extrusion shaping we have found it desirable to employ a hollow worm and to circulate therein a cooling fluid so that the surface of the worm remains substantially cooler than either the chocolate mass being extruded or the extruding die. We prefer a worm whose groove becomes progressively smaller in section from the intake to the exit and whose pitch in terms of turns per unit length increases in the same direction. Such a worm is satisfactorily shaped from a steel bar and subsequently tin coated.

Where tableting machines or the like are employed, there should be a loose fit between the walls of the tablet chamber and the pressure piston in order to allow for escape of air. We prefer to employ tableting pressures of the order of at least 1,000 pounds per square inch, and particularly, of the order of several times this pressure, for example, 5,000 to 10,000 pounds per square inch. As in connection with the extrusion procedure, in order to prevent an undue rise in temperature, that is, a temperature of the order of the melting point of the fat constituent, the tableting equipment may be provided with suitable cooling means.

In those cases where the roll-milled or similarly cold-worked chocolate confection materials or compositions have, through long standing, lost their cohesive characteristics to such an extent that, when tableted or otherwise formed into tablets or blocks, they will not produce a solid, dense block substantially free from the tendency to disintegrate upon relatively rough handling, the desired cohesive properties may be re-obtained by subjecting the chocolate confection compositions again to roll-milling or like cold-working treatment. Preferably, however, in such case, the chocolate confection composition or the milling rolls should be slightly moistened with water before or during the roll-milling or similar cold-working operation.

Chocolate products which may be made in accordance with the present invention may have variable compositions but, in all cases, they contain, as predominant ingredients, chocolate and a sugar such as sucrose, dextrose, maltose and lactose, but particularly sucrose; and, in most cases, it is desirable to employ an added fat, such as fats having the characteristics of cocoa butter, but particularly cocoa butter. We may, in addition, although it is not necessary to do so, employ relatively small proportions of supplemental materials such as, for example, flavorings such as vanillin, anti-oxidants, vitamins, cereal flours such as oat flour, and the like.

The proportions of the ingredients are also variable, the chocolate content being equal to, greater than or less than that of the sucrose and, where employed, generally lesser amounts of added cocoa butter and skim milk powder or the like are utilized. Illustrative examples of satisfactory formulae are as follows, all parts being be weight:

|  | Example I | Example II | Example III |
| --- | --- | --- | --- |
| Chocolate (52% fat content) | 25 | 50 | 50 |
| Sucrose | 40 | 50 | 30 |
| Skim milk powder | 20 |  | 20 |
| Cocoa butter | 15 |  |  |

The solid or non-flowable chocolate composition which is to be subjected to cold working in accordance with the present invention may be prepared in any of several ways. For example, the sugar and powdered skim milk may initially be mixed with molten chocolate and cocoa butter. Any suitable mixer may be employed, for example, a blade type mixer, hot rolls, or the like, and the mixing should be continued until the mix is at least somewhat homogeneous in composition. The resulting mixture, after having stood long enough to solidify, may then be subjected, preferably in somewhat subdivided form, to the roll-milling or like action. In order to expedite manufacture, it has been found satisfactory to place the mixture directly into the equipment used for cold working and to freeze it therein to a solid non-flowable consistency, rather than to wait for the dough-like or putty-like mass to become solid prior to subjecting the same to cold working. Still another way of proceeding is to add the various ingredients in solid, powder form to the rolls which are to do the cold working, maintaining low temperatures of the order heretofore mentioned. Thus the preliminary mixing operation is combined with the cold working.

The bars or tablets which are made in accordance with our invention comprise solid, dense blocks of chocolate confection, the tablets or blocks consisting of cohesively united, discrete, solid particles of the mixture of the component ingredients comprising the confection. We have found, in the particularly preferred embodiments of our invention, that the specific gravity of the bars or blocks ranges from about 1.25 to about 1.35.

The ability of chocolate confection bars to withstand hot summer or tropical temperatures is generally measured in terms of a so-called penetrometer test which is a test of its consistency. The test is carried out by submitting a chocolate bar of predetermined shape and size to a warming oven temperature of 120 degrees F. for a period of not less than one hour. When thus softened, a so-called penetrometer cone of predetermined weight and shape is allowed to act upon the softened bar. The extent of the penetration of the penetrometer cone into the bar during a specified time interval is taken as a measure of the consistency of the bar at the elevated temperature of the test. This test is described in detail in the Quartermaster Corps Specification, C. Q. D. No. 19D, July 8, 1942. Whereas chocolate confection bars of the type made in accordance with the previously described prior practices give a penetrometer reading of approximately 6 mm., chocolate confection bars produced pursuant to our invention may be made so as to give materially lower penetrometer readings as, for example, from less than 1mm. upwardly to 4 or 5 mm. We prefer, particularly, such chocolate confection bars as give a penetrometer reading not substantially exceeding 3 mm., and such confection bars possessing this property, in addition to the ability to withstand elevated temperatures over prolonged periods of time without undue softening, form an important, though limited, aspect of our invention.

What is claimed as new and desired to be protected by Letters Patent of the United States is:

1. In a method of preparing chocolate confections having the property of withstanding elevated temperatures without undue softening, the steps which include providing a substantially solid mixture including mainly chocolate and a sugar, subjecting the resulting mixture to cold-working while preventing the temperature of the mixture from exceeding approximately 83 degrees F., and compacting the resulting product to form a solid, dense block.

2. In a method of preparing chocolate confections having the property of withstanding elevated temperatures without undue softening, the steps which include providing a substantially solid mixture including chocolate, sugar and cocoa butter, cold-working the resulting mixture while preventing the temperature of the mixture from exceeding approximately 83 degrees F., and compacting the resulting product to form a solid, dense block.

3. In a method of preparing chocolate confections having the property of withstanding elevated temperatures without undue softening, the steps which include providing a substantially solid mixture including chocolate, sugar, cocoa butter, and skim milk powder, cold-working the resulting mixture while preventing the temperature of the mixture from exceeding approximately 83 degrees F., and compacting the resulting product to form a solid, dense block which gives a penetrometer test not substantially exceeding 3 mm.

4. In a method of preparing chocolate confections having the property of withstanding elevated temperatures without undue softening, the steps which include providing a substantially solid mixture including chocolate, a sugar and cocoa butter, and cold-working the resulting mixture while preventing the temperature of the mixture from exceeding approximately 83 degrees F.

5. In a method of making chocolate confections having the property of withstanding elevated temperatures without undue softening, the steps which include providing a mixture containing predominantly chocolate, a sugar, cocoa butter and dry skim milk, subjecting said mixture to cold-working while maintaining the temperature thereof substantially below the melting point of the cocoa butter whereby to modify the internal structure of the chocolate composition and to render the same somewhat plastic.

6. In a method of preparing chocolate confections having the property of withstanding elevated temperatures without undue softening, the steps which include providing a substantially solid mixture including chocolate, sugar, cocoa butter, and skim milk powder, and roll-milling the resulting mixture while preventing the same from exceeding a temperature of approximately 83 degrees F., removing the composition from the rolls, and compacting said composition, to form a solid, dense block which gives a penetrometer test not substantially exceeding 3 mm.

7. In a method of preparing chocolate confections having the property of withstanding elevated temperatures without undue softening, the steps which include providing a substantially solid mixture, including chocolate, sugar, cocoa butter, and a milk powder, and roll-milling the resulting mixture while preventing the same from exceeding a temperature of approximately 83 degrees F.

8. In a method of preparing chocolate confections having the property of withstanding elevated temperatures without undue softening, the steps which include providing a substantially solid mixture including chocolate, sugar, cocoa butter, and a filler, roll-milling the resulting mixture while preventing the same from exceeding a temperature of approximately 83 degrees F., and scraping the composition from the rolls.

9. In a method of preparing chocolate confections having the property of withstanding elevated temperatures without undue softening, the steps which include providing a substantially solid mixture including chocolate, a sugar and cocoa butter, roll-milling the resulting mixture while preventing the same from exceeding a temperature of approximately 83 degrees F., removing the composition from the rolls, and compacting said composition to form a solid, dense block.

10. In a method of making chocolate confections having the property of withstanding elevated temperatures without undue softening, the steps which include providing a mixture containing predominantly chocolate, a sugar, cocoa butter and dry skim milk, subjecting said mixture to cold-working while maintaining the temperature thereof below the melting point of the cocoa butter whereby to modify the internal structure of the chocolate composition and to render the same somewhat plastic, and then, prior to the destruction of the cohesive property of said composition, compacting the same to produce a solid, dense block of the chocolate composition giving a penetrometer test not substantially exceeding 3 mm.

11. In a method of making chocolate confections having the property of withstanding elevated temperatures without undue softening, the steps which include providing a mixture containing predominantly chocolate, a sugar, a fat of the character of cocoa butter and dry skim milk, roll-milling the resulting mixture while preventing heating thereof to a temperature exceeding approximately 83 degrees F., said roll-milling functioning to modify the internal structure of the chocolate composition and to render the same somewhat plastic, scraping the resulting plastic composition from the rolls, and then, prior to the destruction of its cohesive property, compacting the same to produce a solid, dense block of the chocolate composition.

12. In a method of making chocolate confections having the property of withstanding elevated temperatures without undue softening, the steps which include providing a mixture containing predominantly chocolate, a sugar, a fat of the character of cocoa butter and dry skim milk, roll-milling the resulting mixture while maintaining the temperature thereof below the melting point of the fat whereby to modify the internal structure of the chocolate composition and to render the same somewhat plastic, scraping the resulting plastic composition from the rolls and then, prior to the destruction of its cohesive property, compacting the same to produce a solid, dense block of the chocolate composition giving a penetrometer test not substantially exceeding 3 mm.

13. In a method of making chocolate confections having the property of withstanding elevated temperatures without undue softening, the steps which include providing a substantially solid mixture including chocolate, a sugar and cocoa butter, passing the resulting mixture through opposing rolls one of which revolves at a speed greater than the other, passing a refrigerating medium through said rolls to prevent heating of the chocolate mixture to a temperature exceeding approximately 83 degrees F., said rolls functioning to modify the internal structure of the chocolate composition and to render the same somewhat plastic, scraping the resulting plastic composition from the rolls and then, prior to the destruction of its cohesive property, compacting the same to produce a solid, dense block of the chocolate composition.

14. In a method of making chocolate confections having the property of withstanding elevated temperatures without undue softening, the steps which include providing a substantially solid mixture containing predominantly chocolate, sugar, cocoa butter and dry skim milk, passing the resulting mixture through opposing rolls one of which revolves at a speed greater than the other, passing a refrigerating medium through said rolls to prevent heating of the chocolate mixture to a temperature exceeding approximately 83 degrees F., said rolls functioning to modify the internal structure of the chocolate composition and to render the same somewhat plastic, scraping the resulting plastic composition from the rolls and then, prior to the destruction of its cohesive property, compacting the same to produce a solid, dense block of the chocolate composition giving a penetrometer test not substantially exceeding 3 mm.

15. In a method of making chocolate confections having the property of withstanding elevated temperatures without undue softening, the steps which includes providing a substantially solid mixture containing predominantly chocolate, sugar, cocoa butter and dry skim milk, passing the resulting mixture through opposing rolls one of which revolves at a speed greater than the other, passing a refrigerating medium through said rolls to prevent heating of the chocolate mixture to a temperature exceeding approximately 83 degrees F., said rolls functioning to modify the internal structure of the chocolate composition and to render the same somewhat plastic, and removing the resulting plastic composition from the rolls.

RAYMOND W. CROSLEY.
HERBERT W. CONNER.